May 26, 1925.

W. L. BROOKINS

WELDING MACHINE

Filed Feb. 28, 1922

May 26, 1925.  1,539,638
W. L. BROOKINS
WELDING MACHINE
Filed Feb. 28, 1922   5 Sheets-Sheet 5

Inventor
W. L. Brookins

By Lacy & Lacy, Attorneys

Patented May 26, 1925.

1,539,638

UNITED STATES PATENT OFFICE.

WILLIAM L. BROOKINS, OF CALEDONIA, PENNSYLVANIA.

WELDING MACHINE.

Application filed February 28, 1922. Serial No. 539,887.

*To all whom it may concern:*

Be it known that I, WILLIAM L. BROOKINS, a citizen of the United States, residing at Caledonia, in the county of Elk and State of Pennsylvania, have invented certain new and useful Improvements in Welding Machines, of which the following is a specification.

This invention is an apparatus for welding cylindrical shells, barrels, or tubes of thin metal and having a relatively large diameter. One object of the invention is to provide mechanism whereby the shells will pass continuously under the torch without any loss of time or any space between successive shells. Other objects of the invention are to provide an efficient and economical apparatus which may be operated at high speed and will separate the edges of the shell or other body so as to provide a uniform opening and permit the edges of the opening to approach and meet at the welding point whereby the heat of the welding torch may be efficiently and economically applied; to provide means for absorbing heat from the weld and thereby utilizing and facilitating the natural contraction of the metal; to provide means whereby the heat-absorbing means may be set to correspond to the pitch or relative obliquity of the edges of the shell and hold them together while the weld is cooling so that the finished weld will be free from pin holes or similar imperfections; to provide means for regulating the speed of the shell at the will of the operator; to provide a shell-feeding mechanism which will operate independently of the driving mechanism so that while the shells may be delivered to the apparatus at intervals, they will be fed through the apparatus continuously and without space between the shells. Other objects of the invention will appear incidentally in the course of the following description, and the invention resides in certain novel features which will be particularly pointed out in the claims following the description.

In the accompanying drawings which illustrate one embodiment of my invention—

Figures 2, 3:
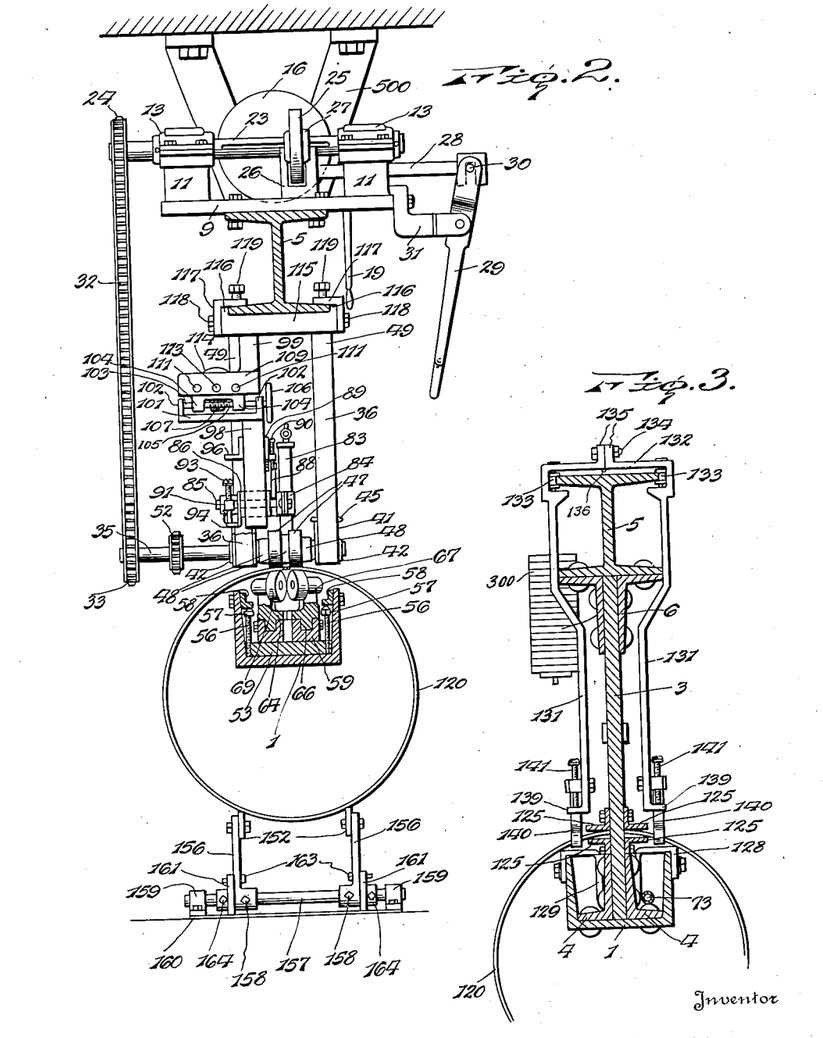
Fig. 2 is a transverse section on the line 2—2 of Fig. 1, the water-feeding parts being omitted to avoid confusion in the illustration.
Fig. 3 is a transverse section on the line 3—3 of Fig. 1 with the shell-feeding carriage in an advanced position.

In the illustrated embodiment of my invention, there is employed a reservoir 1 which may be a channel bar, as shown most clearly in Figs. 2 and 3, having its ends closed, as shown at 2. Near one end of this reservoir, I secure therein a standard or supporting plate 3 which is set on edge on the bottom of the reservoir and along the central longitudinal line of the same. This standard or supporting plate is connected with the reservoir by angle bars 4 riveted or otherwise rigidly secured to the bottom of the reservoir and the sides of the plate. The upper edge of the supporting plate or standard 3 abuts the bottom of an I-beam 5 which extends longitudinally over the reservoir 1 and is rigidly connected with the upper end of the standard or supporting plate 3 by angle bars 6 which are riveted or otherwise secured to the sides of the said standard and to the lower flanges of the I-beam. The I-beam 5 is suspended from the roof or ceiling of the workroom by hangers 500 which may be of any preferred form. The reservoir is provided at one end with an overflow outlet pipe 7 and in its bottom, at any convenient point, is provided with a drain opening 8.

Figure 1:
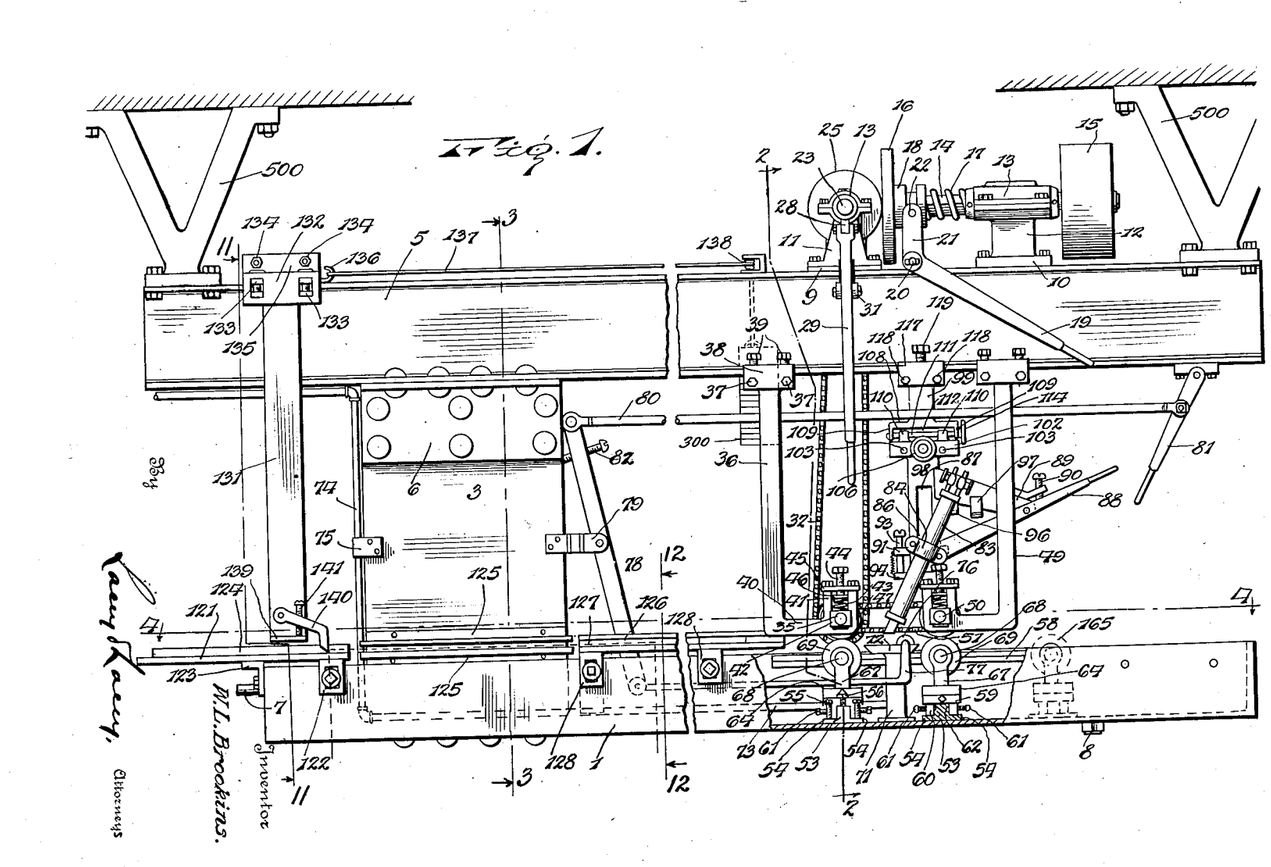
Figure 1 is an elevation, partly broken away, of the apparatus, a portion of one shell being indicated by dotted lines.

Upon the I-beam 5, and near the end thereof more remote from the standard or supporting plate 3, I secure plates or bases 9 and 10 carrying pedestals 11 and 12 respectively, said pedestals forming supports for bearings 13. The bearing carried by the pedestal 12 is disposed longitudinally of the beam 5 and a driving shaft 14 is journaled in said bearing, the said shaft carrying a band pulley 15 at one end and having a friction disk 16 mounted slidably upon its opposite end but constrained to rotate therewith. A spring 17 is coiled around the shaft 14 between the bearing 13 and the circumferentially grooved hub 18 of the friction disk so that the disk will be held normally projected into operative position. When it is desired to withdraw the friction disk so as to stop the operation of the driven welding rolls without arresting the motion of the prime motor, a lever 19 is manipulated. This lever is fulcrumed upon the upper side of the beam 5 and oscillated in a plane parallel with the side of the beam, the fulcrum 20 of the lever carrying a yoke 21 in the ends of which are pins 22 engaging the groove of the hub 18, as will be readily understood. If the lever be swung downwardly, the friction disk will be moved toward the pedestal 12 in opposition to the force of the spring 17, as will be readily understood on reference to Fig. 1. The bearings upon the pedestals 11 are disposed transversely of the beam 5 and in said bearings is journaled a shaft 23 which is equipped at one end with a sprocket wheel 24 and upon which, between the said bearings, is mounted a friction pulley or disk 25. The said disk or pulley 25 is slidably fitted upon the shaft 23, although it is constrained to rotate therewith, and supported slidably upon the base 9 is a yoke 26 which engages the opposite ends of the hub 27 of the said disk, an arm 28 extending laterally from said yoke beyond the end of the base 9 and having a pin and slot connection at its outer end with the forked upper end of a hand lever 29, as shown at 30 in Fig. 2. The lever 29 is carried by a bracket 31 which is secured to the end of the base 9 below the arm 28, as shown most clearly in Fig. 2. It will be readily understood that, by oscillating the lever 29, the arm 28 and the yoke 26 will be moved transversely with respect to the beam 5 and the disk 25 will be thereby shifted radially with respect to the driving disk 16 and the speed of the shaft 23 consequently regulated as desired. A sprocket chain 32 is trained around the sprocket 24 and around a similar sprocket 33 secured upon the end of a transverse shaft 35 which carries the upper welding rollers. The shaft 35 is carried by a hanger 36 which comprises parallel side arms and a cross bar or head connecting the upper ends of said side arms and constructed to fit close against the lower flanges of the I-beam 5. Brackets 38 are secured to the head of the hanger by bolts or rivets 37 and project over the lower flanges of the beam 5 so that the hanger will be suspended upon said flanges. To secure the hanger against shifting while at the same time permitting it, when desired, to be adjusted to any particular point upon the beam 5, I provide set bolts 39 which are mounted in the overhanging portions of the brackets and are turned home against the upper sides of the said lower flanges of the I-beam, as will be readily understood, so that the hanger will be secured in a set position upon the beam. From the lower ends of the side members of the hanger, arms 40 extend longitudinally of the apparatus and at their extremities are constructed with the spaced lugs 41 between which are fitted the bearing blocks 42 carrying the shaft 35. The bearing blocks 42 are slidably fitted to and between the lugs 41 and are held normally in the lower ends of the spaces between said lugs by coiled springs 43, the tension of which is regulated by set screws or bolts 44 mounted in cap plates 45 secured upon the upper ends of the lugs 41, the lower ends of said set screws carrying heads or presser plates 46 resting directly upon the springs. Secured upon the shaft 35 between the bearing blocks 42 are rollers 47 and fitted upon the shaft between the rollers and between the rollers and the respective bearing blocks are spacing collars 48 whereby the rollers will be maintained in the proper operative spaced relation. A second hanger 49 is provided carrying a shaft 50, and this hanger 49 and shaft 50 are duplicates in form and construction to the hanger 36 and shaft 35, except that the arms carrying the shafts are turned in opposite directions and toward each other so that the shafts are disposed between the hangers, as shown clearly in Fig. 1. The shaft 50 is equipped with a sprocket wheel which is operatively connected by a sprocket chain 51 with a sprocket 52 upon the shaft 35 so that the two shafts 35 and 50 and the rollers carried thereby will be driven in the same direction and at the same speed.

Figure 4:
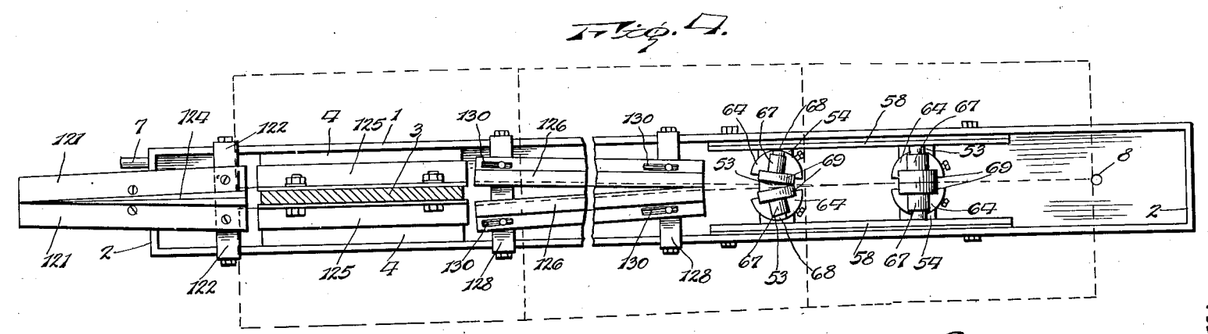
Fig. 4 is a horizontal section on the line 4—4 of Fig. 1.
Figure 6:
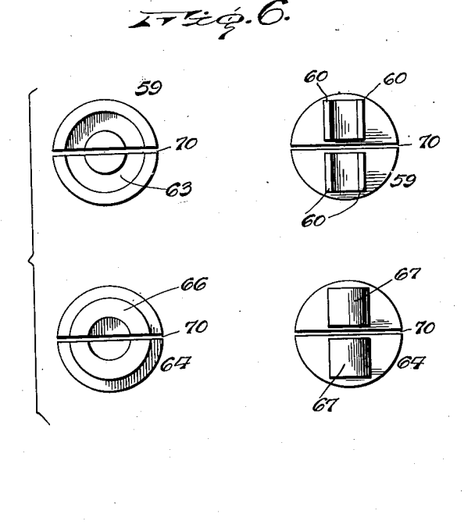
Fig. 6 are detail top and bottom plan views of the roller supports.

Within the reservoir 1, transversely thereof and in the vertical planes of the shafts 35 and 50, I provide cross bars 53 having side flanges or extensions 54. Set screws or bolts 55 are mounted in these flanges or extensions 54 and bear upon the bottom of the reservoir so as to adjust the cross bars 53 to any desired height and insure a firm plumb setting therefor. Other set bolts 56 are mounted in the ends of the cross bars and are constructed with pointed heads 57 bearing against the under sides of flanges or cleats 58 on the sides of the reservoir near the upper edges thereof so that a very fine accurate adjustment of the cross bars may be effected and the proper functioning of the pressing rollers obtained. Upon each cross bar 53, I mount bases or supports 59 provided on the under side with depending lugs 60 of proper form to fit over the cross bar and carrying set screws 61 adapted to engage in longitudinal grooves 62 in the sides of the cross bar and thereby secure the bases in a set position upon the cross bar. In the upper side of the base block is an arcuate groove 63 and mounted upon the base is a stand consisting of a body portion 64 provided on its under side with an arcuate rib 66, adapted to fit within the groove 63 of the base, and equipped upon its upper side with bearing lugs 67 adapted to support shafts 68 having rollers 69 loosely mounted thereon. The stands and the bases are preferably cast and finished and after being properly milled are cut through upon a diameter extending between the lugs 60 upon the base and the bearings 67 upon the stand, as shown at 70 in Fig. 6. This process insures accuracy in the finished parts and permits the shafts 68 to be set at any desired angle relative to each other, while maintaining a constant relation to the central longitudinal plane of the apparatus. By referring to Fig. 4 moreover, it will be noted that the rollers 69 may be set so that their opposed faces will be in contact upon the central longitudinal line of the apparatus. The bases 59 may then be separated to any desired extent and secured in set positions upon the cross bar 53 so that they will be disposed equi-distantly from the central longitudinal plane of the apparatus. The stands may then be rotatably adjusted upon the bases so that the rollers 69 will be disposed at angles corresponding to the angles of the opposed edges of the shell to be welded and the desired pressure upon the said edges will thus be very easily and readily established.

Between the two cross bars 53, I provide upon the bottom of the reservoir 1 a standard 71, upon the upper end of which is carried a pan 72. The standard 71 is hollow and a water supply pipe 73 extends upwardly through the standard to discharge into the pan 72, the said pipe being connected with any convenient source of supply and being carried into the reservoir along one edge of the plate 3, as shown at 74, being held to said plate by a clip or bracket 75 and extending longitudinally of the reservoir at the side of the plate and beyond the same to the standard 71. A roller 76 is disposed within the pan 72 and is mounted loosely upon an arm 77 which is disposed at the side of the pan and the standard and extends longitudinally of the reservoir to be pivoted to the lower end of a rocking bar 78 which is fulcrumed between its ends in a bracket 79 on the plate 3 and at its upper end is pivoted to one end of a link or connecting rod 80. The said connecting rod 80 extends longitudinally of the I-beam 5 and is pivoted to a hand lever 81 fulcrumed upon the under side of said beam, as shown clearly in Fig. 1. A set screw 82 is mounted in the upper portion of the rocking bar 78 and is adapted to bear against the edge of the plate 3 so as to limit the movement of the bar and also maintain the roller 76 in a set position. The roller 76 is preferably formed by or covered with some absorbent material whereby the water in the pan will be taken up and applied to the under side of the welded joint below the torch 83 so as to withdraw from the weld some of the heat and thereby facilitate the contraction of the metal and, as a result, produce a very strong weld.

Figures 7, 10:
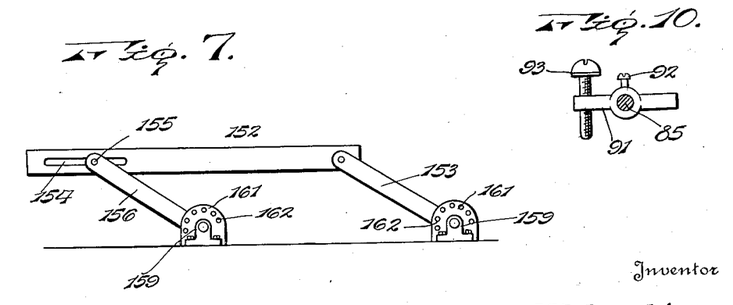
Fig. 7 is a detail elevation of a support which may be provided to maintain the shell in proper position as it is fed to the welding elements.
Fig. 10 is a detail elevation of a rocking device by which the position of the torch is controlled.
Figures 8, 9:
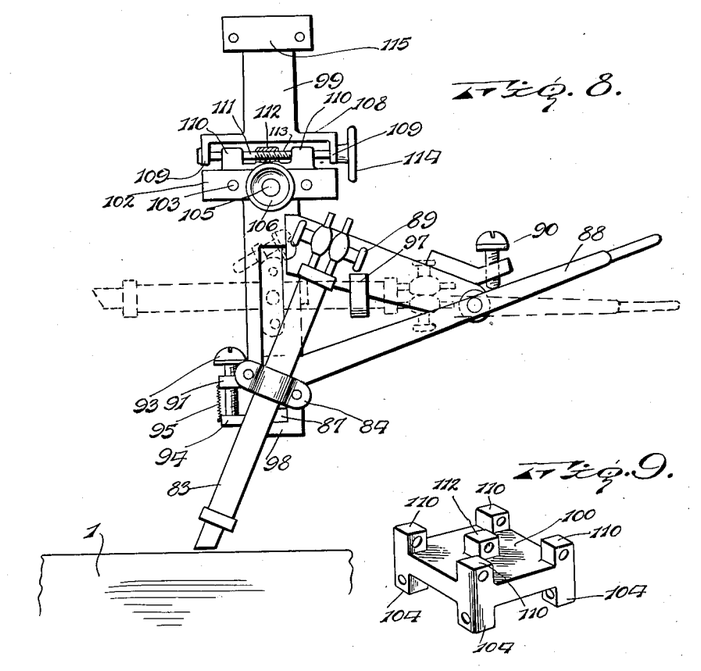
Fig. 8 is an enlarged side elevation of the torch and its mountings.
Fig. 9 is a detail perspective view of an adjustable coupling head forming a part of the support for the torch.
Figure 11:
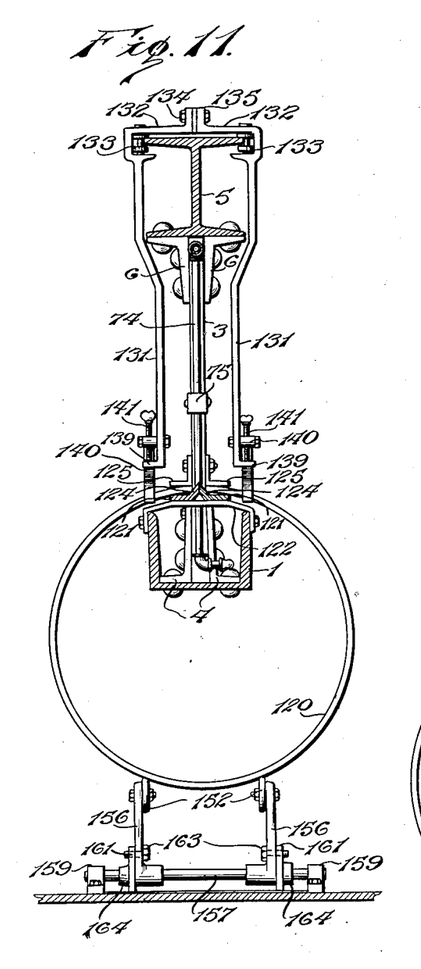
Fig. 11 is a detail transverse section on the line 11—11 of Fig. 1.
Figure 12:
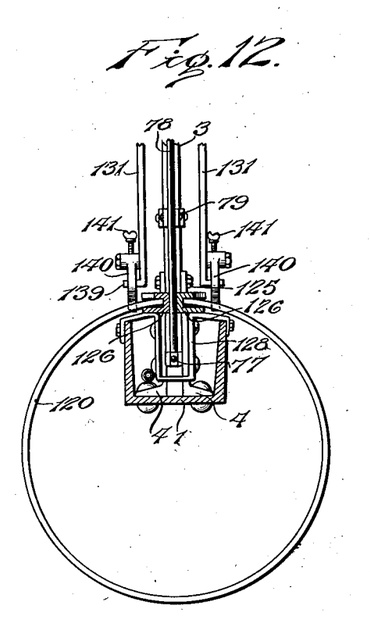
Fig. 12 is a detail transverse section on the line 12—12 of Fig. 1.

The torch 83 may be any preferred form of oxyacetylene torch and is mounted in a clamp collar 84 from which extends a shaft or pin 85 which is mounted to rock in a block 86 fitted within a slot 87 of a hanger which is secured to and depends from the beam 5. The vertical movement of the block 86 is controlled by a hand lever 88 fulcrumed upon a bracket 89 projecting from the torch-carrying hanger, a set screw 90 being provided at the end of the bracket to bear upon the lever and limit the upward movement thereof, thereby determining the limit of the downward vertical movement of the block 86 and the torch carried thereby. The lever 88 is longitudinally notched at its working end to engage the shaft or pin 85 and a moving force applied to the free or handle end of the lever will cause vertical movement of the block 86 in the opposite direction within the slot 87. At the outer side of the torch-supporting hanger, a shifter bar 91 is secured upon the shaft 85 by a set screw 92, the ends of the bar projecting radially from the shaft in diametrically opposite directions. A set screw 93 is mounted in the front end of the bar 91 and bears upon the end of an abutment 94 which is carried by the slide or bearing block 86, a coiled spring 95 being secured to and extending between the abutment and the end of the shifting bar to normally hold the screw against the abutment and thereby maintain the torch in the desired angular position. A second abutment 96 is secured upon the side of the hanger in the path of the rear end of the shifter bar so that, when the lever 88 is manipulated to raise the torch, the rear end of the shifter bar will be brought into contact with the said abutment 96 and the bar will be consequently rotated with the shaft 85 and the torch quickly brought into a substantially horizontal position. When the lever is manipulated to lower the slide 86, the spring 95 at once returns the parts to normal and the torch resumes its predetermined angular position. To support the torch in its raised position, a spring latch 97 is secured upon the bracket 89 in position to engage under the lever as will be readily understood.

The torch-supporting hanger comprises a lower member 98, an upper member 99, and a coupling head 100 connecting the said members. The lower hanger member carries the torch and the elements for adjusting the same, and is provided at its upper end with a lateral coupling arm or offset 101 having upstanding flanges 102 at its longitudinal edges and in said flanges, near the ends thereof, are secured guide rods 103 upon which are slidably engaged the guide lugs 104 depending from the corners of the coupling head 100. Journaled in the flanges 102 at the center thereof and arranged parallel with the guide rods 103 is an adjusting screw 105 equipped at one end with a hand wheel 106 and having threaded engagement with a lug 107 depending centrally from the coupling head. The upper hanger member is provided at its lower end with a lateral offset or coupling arm 108 provided with depending flanges 109 at its transverse edges. On the upper side of the coupling head 100, at the corners thereof, are upstanding lugs 110 having openings therethrough at right angles to the openings through the lugs 104, and guide rods 111 are passed through said lugs and secured at their ends in the flanges 109. A lug or post 112 rises centrally from the coupling head and has a threaded bore arranged at a right angle to the threaded bore of the lug 107. An adjusting screw 113 is journaled in the flanges 109 and is engaged within the bore of the lug 112, as will be readily understood, an operating head or hand wheel 114 being secured upon one end of the screw. The upper end of the upper hanger member is formed into a clamping rest or head 115 adapted to fit closely against the bottom of the I-beam 5, as best shown in Fig. 2, and having longitudinal lips 116 at its ends to fit against the edges of the lower flanges of the beam. Clamping plates 117 are secured to the ends of the rest 115 by bolts 118 and overhang the flanges of the beam to which they are secured by set screws 119. It will be readily noted that by properly manipulating the adjusting screws 105 and 113, the lower hanger member may be shifted longitudinally and transversely and the torch brought accurately to the welding point. After the several adjustments have been once effected, the torch may be raised quickly from the work to permit regulation of the flame or inspection of the work, and returned to the working position without requiring any readjustment.

The shells or tubes, indicated at 120 in Figs. 2 and 3, are delivered singly to the apparatus upon the loading plates 121 which project from the reservoir 1 at the end remote from the torch and the rollers. These loading plates are carried by brackets 122 and 123 which are secured to the sides and end of the reservoir respectively and are capable of a limited vertical adjustment, the bracket 122 extending over the reservoir, as shown most clearly in Fig. 4. The loading plates are provided upon their upper sides with dividing ribs 124 which extend longitudinally and the outer side surfaces of which diverge toward the standard or supporting plate 3. It will be understood that the shell is so positioned upon the loading plates that the longitudinal edges thereof will engage and pass at opposite sides of the said spreading ribs 124, the result being that the said longitudinal edges of the shell will be spaced apart uniformly from end to end. From the loading plates, the shell passes to guides upon the sides of the standard or supporting plate 3 and will be maintained in the opened condition by the said standard. The guides upon the standard consist of angle bars 125 secured upon the sides of the standard with their horizontal flanges spaced apart vertically whereby the edges of the seam or opening in the shell will be received between said horizontal flanges. Between the guides 125 and the first rollers 69, additional guiding supports 126 are provided, these guiding supports converging from the standard 3 toward the said rollers, as clearly shown in Fig. 4. The guides 126 may be in the form of bars provided with longitudinal groves 127 in their outer sides to receive the longitudinal opposed edges of the shell and these bars are carried by brackets 128 secured to the sides of the reservoir and extending over the same, as shown. The said brackets have central depending U-shaped portions 129 (see Fig. 3) to accommodate the rocking bar 78 and are capable of a limited vertical adjustment to suit varying conditions, and the guides may be shifted longitudinally upon the brackets by reason of the slots 130 formed longitudinally in the base portions of the bars and securing bolts inserted through said slots into the brackets 128.

From the guides 126, the edges of the shell pass between the rollers 69 and the rollers 47 and these rollers exert the desired supporting and feeding pressure upon the shell so that the shell will be fed evenly past the torch and a uniform weld produced. In supplying the shells to the apparatus, one shell is brought into position with its end engaging over the ends of the loading plates and it is pushed forward until it enters between the guides 125, after which another shell is brought into position to be placed on the loading plates. Consequently, the shells will not be in abutting relation forming a continuous line as they leave the loading plates and there will be intervals when no shell will be upon the loading plates 121, but the shells will be presented continuously to the welding mechanism inasmuch as they are fed to said mechanism by means which operates independently thereof. This feeding means comprises hangers 131 depending from and preferably integral with a carriage 132 which is equipped with rollers 133 riding upon the upper flanges of the I-beam 5. The carriage and hangers are shown as consisting of two similar members properly shaped to fit around the I-beam and secured together above the beam by bolts 134 inserted through upstanding flanges 135 at the meeting edges of the members. Upon the front end of the carriage 132 is a hook or similar device 136 to which is attached a cable or other flexible connection 137, which cable or flexible connection passes longitudinally above the beam 5 to a guide roller 138 mounted upon said beam. The cable is engaged around the said guide roller and passes laterally therefrom to a second guide roller (not shown), the end of the cable depending from the said second guide roller and being equipped with a weight of any preferred form indicated at 300, so that the weight tends constantly to pull the carriage and the hangers forward. Each hanger 131 is constructed with a lateral abutment 139 at its lower end and a dog 140 is pivoted upon the side of the hanger adjacent and above the said abutment, the downward movement of said dog being limited by a set screw 141 mounted in the dog and bearing upon the abutment. The shell to be welded, after being brought into position upon the loading plates 121, is pushed forward until the dogs drop into engagement with the rear end of the shell, the operator having retracted the hanger and the carriage to the position shown in Fig. 1, whereupon if the operator releases the carriage the suspended weight connected with the carriage will pull the shell forward until it overtakes and abuts the previously supplied shell. The hanger and carriage are then again retracted so as to be engaged with another shell which has been placed upon the loading plates and it will be readily seen that inasmuch as the feeding devices are not dependent upon the motion or operation of the welding mechanism, the shells last placed in position will be initially caused to travel at a relatively high speed and to overtake and abut the preceding shells so that they will be carried past the welding elements in a continuous line at a uniform speed and without interruption, although they are supplied to the apparatus singly.

Figure 5:
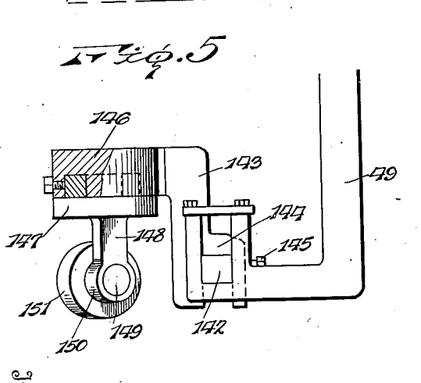
Fig. 5 is a detail elevation of a roller which may be employed under some circumstances in addition to the rollers shown in Fig. 1.

When welding very large shells made from very thin material and operating at a high speed, it will frequently be desirable to provide welding rolls which are not positively driven. In this event, the shaft 50 with its bearings and co-operating parts is removed from the hanger 49, and a cross bar 142 is fitted in the lower arms of said hanger as a substitute for said shaft. A supporting block or post 143 constructed with a fork 144 is fitted over the said cross bar 142 and secured thereto by a set screw 145. This block or post 143 is constructed with a circular head 146 disposed laterally at the upper end of the post and provided in its under side with a circular or annular groove to receive an annular rib upon a head 147 which corresponds in form and construction to the stands 67, except that the shaft carrying post 148 depends from the head 147 instead of rising therefrom. A shaft 149 is mounted in a bearing 150 at the lower end of the post 148 and the welding roller 151 is carried by the said shaft. Obviously, the circular rib and groove permit the device to be set or pivotally adjusted so that the roller 151 may be made to assume any desired angular position. It is also obvious that additional hangers may be provided if desired and they may carry rollers which are positively driven or free as conditions may require or suggest.

The water fed into the pan 72 will overflow therefrom and will moisten the rollers 69 so that some of the water will be transferred to the under side of the joint or weld and the contraction of the metal itself effectually utilized. The shells are fed to the welding mechanism in the described manner and will pass continuously through and beyond the welding point or stage so that the desired homogeneous joint will be produced rapidly and effectively. It will be readily observed that, prior to reaching the heating point of the apparatus, the shell has been opened and then permitted to close so that contraction of the shell is actually occurring when the torch begins to act thereon and the welding is accomplished at the point where the edges of the shell meet after passing through the several guides. The particular arrangement of guides employed by me assists the shell to produce a uniform opening without setting up any breaking strain in the article and, as the welding heat is applied to the edges of the opening, water-cooled rolls bear against the under surface of the weld and absorb heat therefrom so that the natural contraction of the metal is expedited, and, as these rolls are disposed at an angle, the desired pressure upon the molten or highly heated metal is obtained and a superior article is produced. These water-cooled rolls may be set to any desired angle so that they will force the edges of the shell together and will hold them together while the weld is cooling so that the finished weld will be free from pin holes. Furthermore, the texture of the weld will be very similar to a weld which has been produced by hammering.

It is desirable to provide supports for the shell in addition to the support provided by the several guides. To this end, I provide bars or rails 152, each of which is pivoted at one end to the upper end of a swinging arm or link 153 and at its opposite end is constructed with a longitudinal slot 154 engaged by a pin 155 at the upper end of a link or arm 156 similar in all respects to the link or arm 153. The arms or links are secured to a shaft 157 by set screws 158 mounted in their respective hubs, the shaft being journaled in bearings 159 secured upon the floor of the workroom or upon a metal wear plate 160 anchored upon the floor. Locking plates 161 are fitted upon the shaft 157 against the sides of the arms 153 and 156 with their lower edges bearing upon the floor or the plate 160. Openings 162 are formed through the plates 161 and locking pins 163 are inserted through proper ones of said openings and registering openings in the swinging arms to hold the arms in a set position. Stop collars 164 are secured upon the shaft at the sides of the locking plates to maintain them in proper relation to the swinging arms. By shifting the pins 155 in the slots 154 the bars or rails 152 may be set at an inclination to facilitate the loading of the shells onto the loading plates 121 and by adjusting links 153 and 156 in vertical planes the rails may be set at a higher or lower position to accommodate shells of various diameters. By shifting the several elements along the shafts 157, the rails may be adjusted toward or from each other to accommodate the curvature of various shells.

To prevent dipping of the welded portion of a shell as it passes from the feeding or welding rollers, I may provide a supporting roller 165 within the trough near the rear end of the same.

The guides employed in my machine provide a uniform opening in the shell to accommodate the natural expansion of the metal under heat, and I am enabled to apply the heat of the torch to the edges of the shell just before the space is entirely closed. Less heat is then required to reduce the metal to a partly molten state than if the edges were tightly pressed together at the welding point.

Having thus described the invention, what is claimed as new is:

1. In a welding apparatus, the combination of welding mechanism, means for guiding parts to be welded to said mechanism, and means whereby as said parts are fed to the welding mechanism they will be separated to produce a uniform opening and then permitted to approach so as to meet at the point of welding.

2. In a welding apparatus, the combination of means for feeding parts to be welded past a welding point, means for applying heat to the edges of said parts at the welding point, and means for applying a cooling medium to the under surfaces of said parts approximately at the welding point.

3. In a welding apparatus, the combination of sets of feeding rolls, means for driving some of said rolls whereby parts to be welded will be fed between and past the rolls, means for applying welding heat to parts to be welded at a point between the rolls, and means for applying a cooling medium to the under surfaces of said parts.

4. In a welding apparatus, the combination of a series of feeding rolls, means for delivering parts to be welded to said rolls, means for operating said rolls whereby to feed the said parts between and past the rolls, means for applying heat to the edges of the parts to be welded as they are fed by and past said rolls, an absorbent roller bearing against the under surfaces of the parts to be welded at the point of application of heat, and means whereby a cooling liquid will be applied to said absorbent roller.

5. In a welding apparatus, the combination with means for applying heat to parts to be welded, of feeding rollers pressing upon the parts to be welded in advance and in rear of the said heat-applying means, means for positively driving some of said rollers, other rollers below and co-operating with the feeding rollers and means for varying the angular position of the last-mentioned rollers whereby to force the parts to be welded toward each other.

6. In a welding apparatus, the combination with means for applying heat to parts to be welded, of feeding rollers pressing upon the parts to be welded in advance and in rear of the heat-applying means, rollers disposed in an angular position below the feeding rollers whereby to force the parts to be welded toward each other, and means whereby the angular position of said rollers may be varied.

7. In a welding apparatus, the combination of means for applying heat to parts to be welded, feeding rollers disposed in advance and in rear of said heat-applying means, presser rolls disposed below the said feeding rollers and cooperating therewith, and means whereby the said presser rolls may be shifted angularly and transversely of the parts to be welded without varying the longitudinal position of the feeding rolls.

8. In a welding apparatus, the combination of means for applying heat to the parts to be welded, feeding rollers arranged to bear upon said parts in advance of and in rear of said means for applying heat, supports disposed below the said feeding rollers and adjustable transversely of the parts to be welded, presser rolls carried by said supports, and means for adjusting the said presser rolls in circular paths upon said supports.

9. In a welding apparatus, the combination of a reservoir, means for supplying a cooling liquid thereto, means above the reservoir for applying heat to parts to be welded, means for feeding the parts to be welded longitudinally over the reservoir past said means for applying heat, feeding rollers supported above the reservoir to bear upon the said parts to be welded, and rolls mounted within the reservoir to apply cooling liquid to the under surfaces of the parts to be welded.

10. In a welding apparatus, the combination of feeding rolls, supports disposed below the feeding rolls and having arcuate grooves in their upper ends, stands provided on their under sides with arcuate ribs seating in the arcuate grooves in the supports, and presser rolls carried by said stands to co-operate with the said feeding rolls.

11. In a welding apparatus, the combination of a reservoir, a pan supported in elevated position within the reservoir, means for feeding parts to be welded longitudinally over the reservoir and over said pan, means for applying heat to the parts to be welded at a point above the said pan, an absorbent roller arranged within the pan and bearing against the under sides of the parts to be welded, and means for supplying a cooling liquid to said pan.

12. In a welding apparatus, the combination of a reservoir, means over the reservoir for applying heat to parts to be welded, means for feeding parts to be welded longitudinally over the reservoir past the means for applying heat, said means comprising feeding rollers supported above the reservoir adjacent the means for applying heat, driving means mounted above said feeding rolls and operatively connected therewith, and means for varying the speed imparted to the feeding rolls by said driving means.

13. In a welding apparatus, the combination of heating elements, feeding rolls arranged to feed parts to be welded past said heating elements, a driving shaft disposed above the said feeding rolls, a transmission shaft disposed at a right angle to the driving shaft, operative connections between the transmission shaft and the feeding rolls, means for rotating the driving shaft, a friction pulley slidably mounted on the transmission shaft and constrained to rotate therewith, means for shifting said pulley along said shaft, a driving pulley slidably fitted upon the driving shaft and frictionally engaged with the pulley upon the transmission shaft, means for yieldably holding the driving friction pulley in engagement with the pulley on the transmission shaft, and means for withdrawing the driving friction pulley from the transmission friction pulley.

14. In a welding apparatus, the combination of a main supporting beam, hangers mounted upon and depending from the said beam and adjustable longitudinally thereof, feeding rollers carried by some of said hangers, a torch carried by another hanger, means for delivering parts to be welded to the feeding rollers, and means for driving said feeding rollers whereby to feed the parts to be welded past the torch.

15. In a welding apparatus, the combination of welding mechanism, means for feeding parts to be welded past said welding mechanism continuously, and means whereby parts to be welded supplied at intervals will be caused to move to and past the welding mechanism in abutting relation to previously delivered parts to be welded.

16. In a welding apparatus, the combination of welding mechanism, a loading platform to receive parts to be welded, guides disposed between said loading platform and the welding mechanism, and means whereby parts to be welded placed at intervals upon the loading platform will be delivered through the guides to the welding mechanism in a continuous uninterrupted series.

17. In a welding apparatus, the combination of welding mechanism, guides leading to said mechanism, a carriage mounted above the guides, means tending constantly to draw said carriage forward toward the welding mechanism, hangers depending from said carriage, and dogs carried by said hangers and adapted to engage parts to be welded whereby to deliver said parts to the welding mechanism in a continuous series.

18. In a welding apparatus, the combination of welding mechanism, a loading platform spaced from the welding mechanism and provided with a central rib, the sides of which diverge toward the welding mechanism, a support disposed adjacent the end of said platform and between the same and the welding mechanism, guides on the sides of said support to receive parts to be welded from the platform, and other guides disposed between the last-mentioned guides and the welding mechanism and converging toward said mechanism.

19. In a welding apparatus, the combination with means for applying heat to parts to be welded, of feeding rollers pressing upon the parts to be welded in advance and in rear of the heat-applying means, rollers disposed in angular relation below the feeding rollers whereby the parts to be welded will be forced toward each other, and means for positively rotating some of the rollers.

20. In a welding apparatus, the combination of means for feeding parts to be welded to a welding station, means for spacing said parts as they pass to the welding station, and presser devices disposed in angular relation and bearing upon the parts to be welded whereby to force the parts together.

21. In a welding apparatus, the combination of welding mechanism, means for feeding a shell to the welding mechanism, means for separating the edges of the shell as it passes to the welding mechanism, and supporting rails for the shell below the feeding means.

22. The combination of welding mechanism, a loading platform to receive parts to be welded, means for feeding said parts to the welding mechanism, supporting rails for said parts below the loading platform, and means for dipping the ends of said rails below the receiving end of the platform.

23. The combination of welding mechanism, a loading platform to receive parts to be welded, means for feeding said parts to the welding mechanism, supporting rails for said parts below the loading platform, means for pivotally adjusting said rails in vertical planes, and means for securing the rails in a set position.

24. The combination of welding mechanism, a loading platform to receive parts to be welded, means for feeding said parts to the welding mechanism, supporting rails for said parts below the loading platform, and means for adjusting the rails toward or from each other.

25. The combination of a supporting frame, a hanger on the frame consisting of upper and lower members, means for adjusting the lower hanger member longitudinally and transversely with respect to the upper hanger member, and a welding torch mounted upon the lower hanger member.

26. The combination of a support, a hanger on the support consisting of upper and lower members, a coupling head connecting said members, means on said head for varying the angular relation of the hanger members, and a welding torch carried by the lower hanger member.

27. The combination of a support, a hanger on the support, a vertically movable slide on the hanger, a welding torch carried by said slide, and means whereby upon upward vertical movement of the slide the torch will be rocked to an inoperative position.

28. The combination of a support, a hanger on the support, a vertically movable slide on the hanger, a welding torch carried by said slide, and adjustable means for limiting the downward vertical movement of the slide.

29. The combination of a support, a hanger on the support, a vertically movable slide on the hanger, a shaft journaled in the slide, a welding torch secured upon the shaft, a projection on the shaft, and an abutment on the hanger in the path of said projection whereby upon extreme vertical movement of the slide the torch will be rocked to an inoperative position.

30. The combination of a support, a hanger on the support, a slide mounted in the hanger, a rock shaft journaled in the slide, a welding torch secured to the rock shaft, a projection on the rock shaft, an abutment on the slide, an adjustable stop mounted in the projection and bearing upon the abutment, and a yieldable connection between the projection and the abutment.

31. In a welding machine, the combination of a shell-supporting frame, means for suspending said frame from an overhead fixed support, and means on the sides of said frame whereby split shells may be supported and fed along the frame in pendent relation thereto.

32. In a welding machine, the combination of a shell-supporting frame, means for suspending said frame from an overhead fixed support, a torch supported above the frame, and means on the sides of the frame whereby split shells may be supported in pendent relation to the frame and fed along the frame under the torch.

33. The combination of welding mechanism, means for feeding split shells under and past the welding mechanism, and means to bear upon the inner surface of the shell at the sides of the split whereby to force said sides together at the point of welding.

34. The combination of welding mechanism, means for feeding split shells under and past the welding mechanism, means to bear upon the inner surface of the shell at the sides of the split whereby to force said sides together at the point of welding, and means to apply a cooling medium to the inner surface of the shell at the split as it passes the welding mechanism.

In testimony whereof I affix my signature.

WILLIAM L. BROOKINS. [L. S.]